United States Patent [19]

Koga et al.

[11] Patent Number: 4,687,894
[45] Date of Patent: Aug. 18, 1987

[54] INDUCTION HEATING METHOD AND APPARATUS FOR RELIEVING RESIDUAL STRESS IN WELDED JOINTS IN PIPE LINE

[75] Inventors: Tadao Koga, Kisarazu; Mitsuru Sugimori, Yokohama; Masanori Terasaki, Yokohama; Tsukasa Maenosono, Yokohama; Satoru Tsushima, Yokohama; Kazuo Yoshida, Yokohama; Tetsusho Kuriwaki, Yokohama; Miharu Hirado, Yokohama, all of Japan

[73] Assignees: Daiichi Koshuha Kogyo Kabushiki Kaisha; Ishikawajima-Harima Jukogyo Kabushiki Kaisha, both of Tokyo, Japan

[21] Appl. No.: 738,967

[22] Filed: May 29, 1985

[51] Int. Cl.⁴ .............................................. H05B 6/40
[52] U.S. Cl. ................................. 219/10.43; 219/8.5; 219/10.57; 219/10.71; 219/10.79; 148/127; 266/129
[58] Field of Search ................ 219/10.41, 10.43, 8.5, 219/9.5, 10.49 R, 10.57, 10.71, 10.75, 10.79; 148/127, 150, 152, 154, 13; 266/129

[56] References Cited

U.S. PATENT DOCUMENTS

| | | | |
|---|---|---|---|
| 1,813,591 | 7/1931 | Ulrey | 219/10.79 |
| 2,933,584 | 4/1960 | Thielsch | 219/10.79 |
| 4,258,241 | 3/1981 | Soworowski | 266/129 X |
| 4,354,883 | 10/1982 | Terasaki | 148/127 |
| 4,505,763 | 3/1985 | Sugihara et al. | 219/10.43 X |

FOREIGN PATENT DOCUMENTS 58-135593  8/1983  Japan .
59-50730  12/1984  Japan .

Primary Examiner—Philip H. Leung

[57] ABSTRACT

A heating method and apparatus for effecting the residual-stress-relief treatment of a welded joint in a pipe line. A welded joint between main pipes, between a main pipe and a branch pipe, between a main pipe and a pipe base or between a branch pipe and a pipe seat and a portion adjacent to the welded point are uniformly or substantially uniformly heated by an inductor which can be varied into configurations according to the performance of the welded joint. The problems encountered in the conventional residual-stress-relief treatment can be substantially overcome.

3 Claims, 7 Drawing Figures

INDUCTION HEATING METHOD AND APPARATUS FOR RELIEVING RESIDUAL STRESS IN WELDED JOINTS IN PIPE LINE

BACKGROUND OF THE INVENTION

The present invention relates to a heating method and apparatus for carrying out residual-stress-relief treatment by induction heating (Induction heating stress improving treatment) of a pipe line system in industrial plants and nuclear power plants under construction or in operation especially of welded joints between main and branch pipes and portions adjacent to the welded joints.

Recently, such residual-stress-relief treatment has been widely carried out in a pipe line of a nuclear power plant under construction or in operation in order to eliminate residual tensile stress caused in inner surfaces of pipes by thermal stress on the pipes joined together by welding or to change such residual stress into compression stress.

When the welded joint between pipes in a pipe line is left as-welded, carbide is precipitated in grain boundaries of the surfaces adjacent to the welded joint so that the microstructure sensitizes and the residual stress is caused in the inner surfaces of the pipes adjacent to the welded joint therebetween. When the operation of a plant is started under these conditions and, for instance, a high-temperature and high-pressure liquid is forced to flow through the pipe line, corrosive components in the liquid synergetically effect with the sensitized structure and the residual stress so that intergranular corrosion cracks result at the portions adjacent to the welded joint. The residual-stress-relief treatment is made so as to overcome such intergranular corrosion cracks as described above.

The residual-stress-relief treatment, which is directed to elimination of the residual tensile stress caused in the inner surfaces of the pipes or change of the same into the compression stress, is carried out as follows. First, while a liquid flow is forced through a pipe line so as to cool inner surfaces of pipes, a suitable external heating device is used to locally heat only the welded joint and a portion adjacent thereto so that a predetermined temperature difference results between the outer and inner surfaces of the pipes. As a result, the thermal stress in excess of the yield point is caused at the heated portion. Thereafter, the heated portion is cooled to room temperature so that the temperature difference between the outer and inner surfaces of the pipes can be eliminated. When such residual-stress-relief treatment is carried out in practice in a plant, there arise the following problems.

For instance, when a welded joint is subjected to the residual-stress-relief treatment, the temperature of all the heated portion must not exceed a critical temperature and the temperature difference between the outer and inner surfaces of a predetermined portion including the welded joint (for instance, a portion $3\sqrt{Rt}$ in length in the axial direction of the joined pipes, where R is the radius of the pipes and t is the thickness of the pipes) must be raised to a level at which the residual stress can be relieved. To this end, the shapes of the welded joint and a predetermined portion adjacent thereto must be investigated in full detail and then configuration of an inductor which can attain a most preferable temperature distribution must be determined before a best suitable induction for carrying out the residual-stress-relief treatment of this specific welded joint is fabricated.

However, component parts which constitute a pipe line and which must be joined to each other by welding include not only straight pipes but also elbows, tees, crosses, valves, pumps, sweepolets (trade name: set-in type nozzle), weldolets (trade name: set-out type nozzle), caps and so on. The actual shapes and precise sizes of these component parts cannot be obtained from drawings thereof (because the sizes of these component parts described on their drawings are the so-called design sizes or reference sizes which determine the maximum or minimum allowable sizes so that the design sizes might not coincide with the actual sizes). As a result, in the case of the fabrication of an inductor, the shapes, sizes and other required data of these components must be measured in the field and an inductor suitable for a specific component part must be fabricated based upon the actually measured data as described above. As a result, much time and labor are needed.

Especially in the case of a nuclear power plant in operation, the shapes and sizes of these component parts must be measured only during a shutdown period (a few months) in which nuclear fuel elements are replaced and which is cycled every one or one and a half years generally. Furthermore, it takes about four months to obtain the above-described data, design and fabricate an inductor so that it is impossible to carry out the residual-stress-relief treatment during one shutdown period. As a result, the residual-stress-relief treatment is carried out in practice during the next shutdown period.

If there is a danger that intergranular corrosion cracks would be caused until the next shutdown period, the previous or first shutdown period must be increased by about two months so that the complete residual-stress-relief treatment can be carried out. Such increase in shutdown period usually results in a fuel difference loss of as high as billions yen (that is, a difference in cost between nuclear fuels and heavy oil or coal fuels), so that a tremendous economical loss is incurred.

Furthermore, in the case of the residual-stress-relief treatment of a pipe seat (a member interposed between a main pipe and a branch pipe when they are joined together), not only the pipe seat but also a predetermined portion of the main pipe adjacent to the welded joint between the main pipe and the pipe seat and a predetermined portion of the branch pipe adjacent to the welded joint between the branch pipe and the pipe seat as well must be heated to a predetermined temperature. In this case, even when the actual shapes and sizes of the main pipe, the pipe seat and the branch pipe are available, the assembly of the main pipe, the pipe seat and the branch pipe is very complicated in shape. As a consequence, it is impossible in practice to uniformly heat such assembly. Therefore, in practice, a full-size mock-up of the assembly must be fabricated based upon the actually measured data, and the shape and size of an inductor are modified based upon this full size mock-up so that a suitable inductor capable of uniformly heating the assembly must be designed and fabricated. That is, the so-called mock-up tests must be carried out to design and fabricate an optimum inductor for carrying out the residual-stress-relief treatment of the assembly.

However, the mock-up tests need much labor and much time so that it is impossible in practice during one shutdown period to measure the shapes and sizes of component parts which will be subjected to the residual-stress-relief treatment, then to carry out the mock-up tests in the manner described above and to design and fabricate an optimum inductor.

Furthermore, in the case of a conventional inductor used to carry out the residual-stress-relief treatment which is designed and fabricated after the mock-up tests based upon the actually measured data of component parts which will be subjected to the residual-stress-relief treatment, the pitches between the coils of the inductor and the clearances between the coils and the surfaces of the component parts are fixed so that it is impossible to change them even when a desired surface temperature distribution cannot be obtained in the residual-stress-relief treatment.

Meanwhile, it has been well known in the art that when a portion of the outer surface of a pipe is heated substantially uniformly by induction heating or the like while water is forced to flow through the pipe, the temperature of this portion is in proportion to the thickness of the wall of the pipe. Therefore in the case of the conventional inductor used in the residual-stress-relief treatment, a clearance between a predetermined portion of a pipe and an induction coil is increased and/or the pitch of the induction coils is increased when it is expected that the temperature of said predetermined portion rises in excess of a predetermined temperature because the thickness of the wall of this portion is thick. However, as described hereinbefore, even when the clearances and pitches are found to be not satisfactory for attaining a desired temperature distribution, it is impossible to change them.

In view of the above, the present invention has for its object to provide a heating method and apparatus capable of uniformly heating a welded joint and portions adjacent thereto in a pipe line in a nuclear power plant under construction or in operation without the need of measuring the actual shapes and sizes of component parts and of designing and constructing an inductor through the mock-up tests in the manner described above.

The above and other objects, effects, features and advantages of the present invention will become more apparent from the following description of preferred embodiments thereof taken in conjunction with the accompanying drawings.

DETAILED DESCRIPTION OF THE PREFERRED EMBODIMENTS

Figure 1:
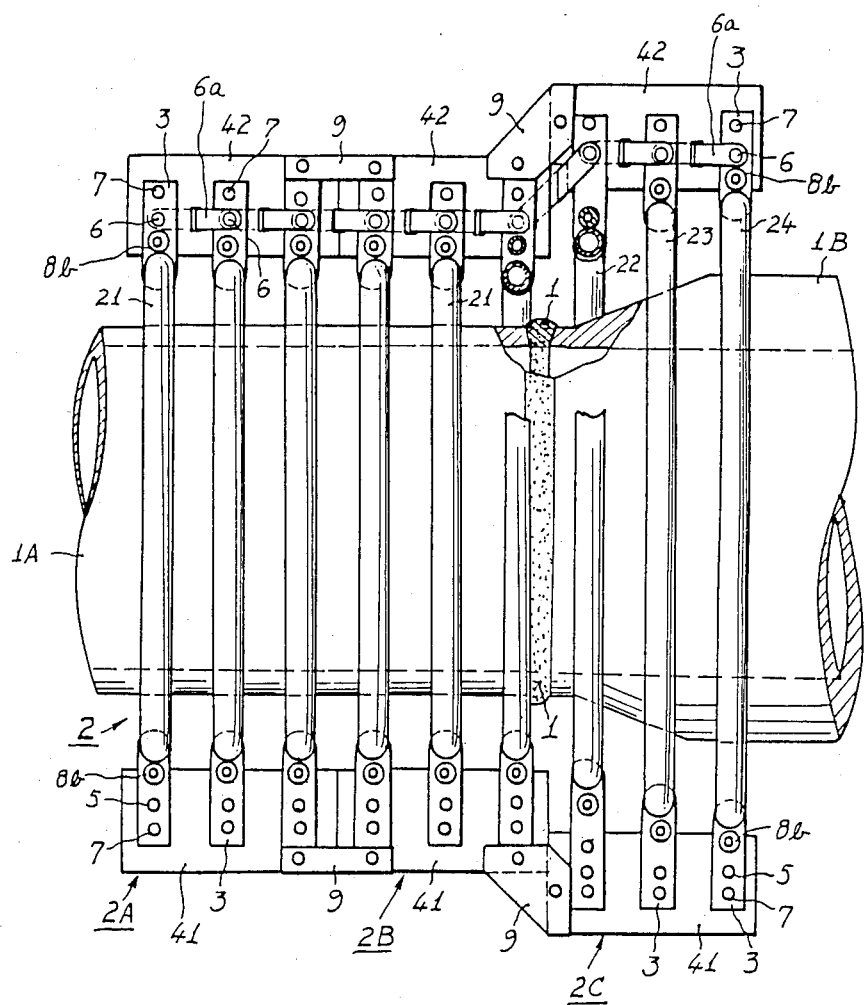
FIG. 1 is a front view of an embodiment of an inductor used to carry out the heating method in accordance with the present invention for making the residual-stress-relief treatment of the welded joint between pipes.
Figure 2:
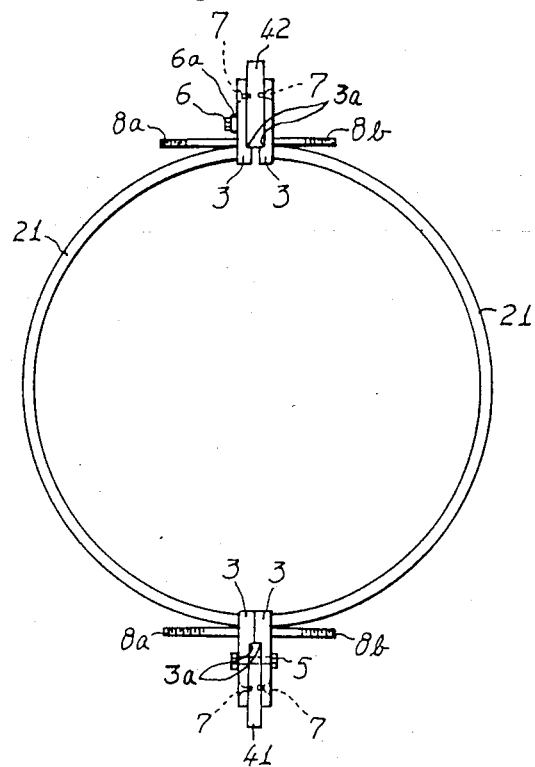
FIG. 2 is a left end view thereof.

FIGS. 1 and 2 show an inductor in accordance with the present invention adapted to be used in carrying out a heating method in accordance with the present invention. Reference numeral 1A designates a stainless steel pipe type 304 and 28 inches in outer diameter and 1B, a stainless steel pipe whose outer diameter and wall thickness are greater than those of the pipe 1A. The pipes 1A and 1B are joined to each other through a welded joint 1 and the welded joint 1 and a predetermined portion adjacent thereto are subjected to the residual-stress-relief treatment by a heating method in accordance with the present invention.

An induction coil assembly 2 comprises a circular hollow copper pipe or tube 25 mm in outer diameter which can be split into two semi-circular sections. The induction coil assembly 2 consists of four portions; that is, a small-diameter induction coil 21, intermediate-diameter induction coils 22 and 23 and a large-diameter induction coil 24.

A connecting tongue 3 is made of an electrically conductive material such as copper and has a stepped portion 3a such that a gap is defined between a pair of connecting tongues 3 when they are mated with each other or disposed in opposed relationship with each other. Each end of the induction coil sections 21, 22, 23 or 24 is made into contact with the outer surface of each tongue 3. Thus, two semi-circular induction coil sections 21 are interconnected by means of the tongues 3 into the circular induction coil as best shown in Fig. 2. The length of the connecting tongues 3 varies depending upon the diameter of the induction coils 21-24 as best shown in FIG. 1 so that the free ends of the connecting tongues 3 joined to the induction coil sections are aligned in the horizontal direction as shown in FIG. 1.

A spacer 41 or 42 made of an electrically insulating material has such a thickness that each spacer 41 or 42 is fitted into the gap defined by a pair of connecting tongues 3 (See FIG. 2), has such a height that the spacer 41 or 42 extends beyond the groove defined by a pair of connecting tongues 3 and has such a width that the spacer 41 or 42 can be fitted into two or more grooves defined by the connecting tongue pairs 3 as best shown in FIG. 1. As best shown in FIG. 2, the thickness of the spacer 41 is such that a pair of opposed connecting tongues 3 are made into intimate contact with each other so that the connecting tongues 3 are electrically connected to each other while the thickness of the spacer 42 is so selected that a pair of connecting tongues 3 are physically spaced apart from each other, whereby they are electrically isolated from each other.

Figure 3:
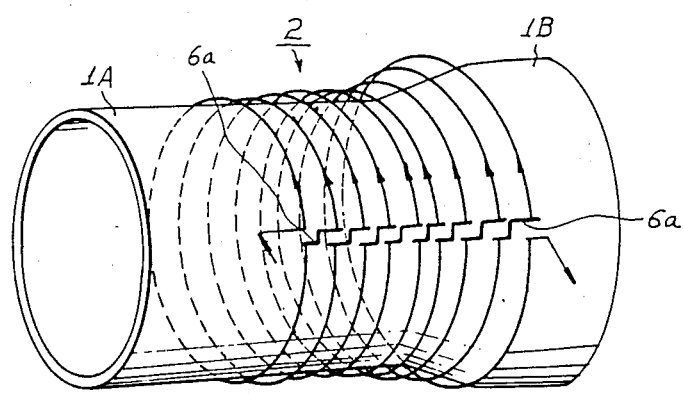
FIG. 3 is a perspective view showing an arrangement of coils of the inductor as shown in FIG. 1.

A pair of connecting tongues 3 and the spacer 41 interposed therebetween are bolted together by means of an electrically conductive bolt 5 as shown in FIG. 2. A pair of connecting tongues 3 and the spacer 42 are bolted together by means of a bolt 6 such that said pair of connecting tongues 3 are electrically isolated from each other. The bolt 6 has a connecting member 6a which electrically interconnects between one of a pair of connecting tongues 3 and the other of an adjacent pair of connecting tongues 3 as best shown in FIG. 3. Furthermore, a pair of connecting tongues 3 and the spacer 41 or 42 are securely bolted together by means of bolts 7. Thus, by means of the connecting tongues 3, the spacers 41 and 42 and the bolts 5, 6 and 7, two or more semi-circular induction coil sections are mechanically and electrically connected in series into one induction coil block generally indicated by the reference numeral 2 as best shown in FIG. 3.

Cooling water is forced to flow from an inlet conduit 8a through each semi-circular induction coil section and is discharged through an outlet 8b so that the induction coil section is prevented from being overheated.

Three induction coil blocks 2A, 2B and 2C each comprising three circular induction coils are disposed adjacent to the welded joint 1 between the pipes 1A and 1B as shown in FIG. 1. These three induction coil blocks 2A-2C are mechanically interconnected at the spacers 41 and 42 by connectors 9. The connecting member 6a of the connecting bolt 6 of one spacer 42 of one induction coil block adjacent to the adjoining spacer 42 is electrically connected to the adjacent connection bolt 6 of the adjoining spacer 42. In this manner, the induction coil blocks 2A-2C are electrically connected in series and constitute the induction coil assembly 2 (See FIG. 3).

According to the present invention, the distances between the induction coils 21-24 and the pitches of the induction coils 21-24 are selected depending upon the outer shapes, wall thickness, materials, etc. of the pipes 1A and 1B such that the whole heated portion has a uniform temperature distribution. Therefore, as described hereinbefore, the induction coils 21-24 have various inner diameters. Furthermore, the spacers 41 and 42 are formed with a plurality of small-pitched bolt holes so that the pitch between the induction coils 21-24 can be varied. Alternatively, the bolt holes may be elongated in the horizontal direction.

As described above, according to the present invention, the induction coil assembly 2 has a plurality of induction coils 21-24 having different inner diameters and the connecting tongues 3 are different in size. The induction coils having different inner diameters can be assembled in parallel with each other by means of the spacers 41 and 42 as best shown in FIG. 1.

Next the mode of operation of the induction coil assembly 2 with the above-described construction will be described. It is assumed that a portion of the pipes 1A and 1B including the welded joint 1 therebetween as shown in FIG. 1 is to be subjected to the residual-stress-relief treatment and be referred to as "a portion to be treated" hereinafter in this specification. Then, depending upon the axial length of the portion to be treated, a suitable number of spacers 41 and 42 and a suitable number of block connectors 9 are selected. Furthermore, in order to uniformly heat the portion to be treated, a suitable number of induction coils 21-24 each having a suitable inner diameter and a suitable number of each bolt 5, 6 or 7 are selected. Thereafter, these selected component parts are assembled around the pipes 1A and 1B into one induction coil assembly 2 in the manner described above.

Next the assembled induction heating coil assembly 2 is energized to check if the portion to be treated can be heated to have a uniform temperature distribution. If a desired temperature distribution cannot be obtained, some of the induction coils 21-24 must be replaced. Then, the induction coil assembly 2 is energized again to see if a desired temperature distribution can be attained. In this manner, the combination and arrangement of the induction coils 21-24 are changed in a trial-and-error manner until an induction coil assembly 2 capable of attaining a desired temperature distribution over the portion to be treated can be obtained.

As described above, according to the present invention, each induction coil 21, 22, 23 or 24 can be replaced by loosening and then tightening the bolts 5, 6 and 7 so that an optimum induction coil assembly adapted to attain a uniform temperature distribution over the portion to be treated can be easily assembled around the pipes 1A and 1B.

The number of induction coil blocks 2A-2C can be increased or decreased depending upon the axial length of the portion to be treated and it is of course possible to change the number of induction heating coils in each induction coil block 2A, 2B or 2C. Furthermore, as described elsewhere, the inner diameters and pitches of the induction heating coils can be changed as needs demand.

Figure 4:
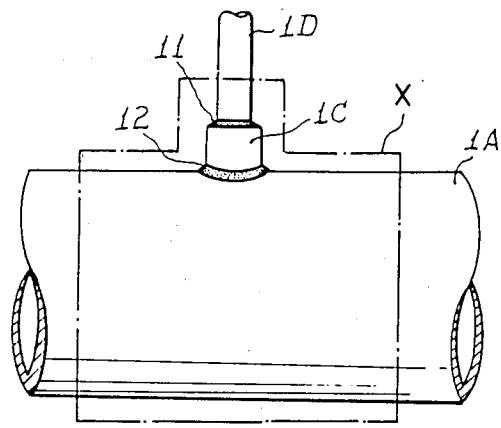
FIG. 4 shows a front view of a pipe assembly which is subjected to the residual-stress-relief treatment in accordance with the present invention.

Referring next to FIG. 4, the residual-stress-relief treatment of a welded joint 11 between a branch pipe 1D and a pipe seat (weldolet) 1C, a welded joint 12 between the pipe seat 1C and a main pipe 1A and portions adjacent these welded joints 11 and 12 will be described. The main pipe 1A and the branch pipe 1D are 28 inches and 4 inches in outer diameter, respectively.

Figure 5:
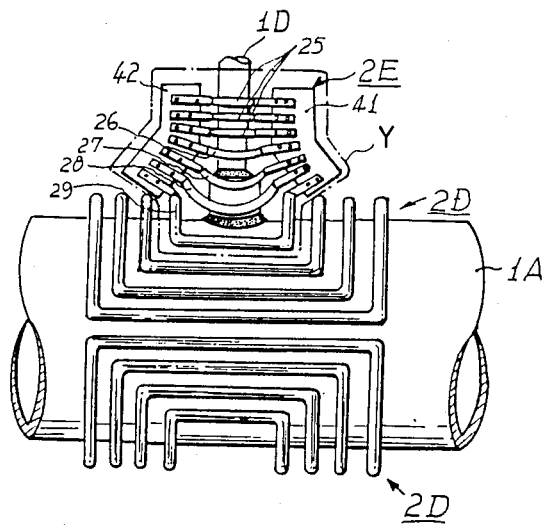
FIG. 5 is a front view of an inductor used to heat the assembly as shown in FIG. 4 in accordance with the present invention.

In order to change the residual stress, which is caused in the surfaces of the portions adjacent to the welded joint 11 of the branch pipe 1D and the pipe seat 1C, into compression stress, a portion surrounded by a one-dot chain line X must be uniformly heated so that a substantially uniform temperature difference between the outer and inner surfaces of the branch pipe 1D and the pipe seat 1C must be produced. (The cooling water is flowing through the branch pipe 1D and the pipe seat 1C so that their inner surfaces are cooled.) In this case, it is difficult to establish a uniform temperature distribution at a portion of the branch pipe 1D adjacent to the welded joint 11 so that the residual-stress-relief treatment is carried out as described below with an apparatus as shown in FIG. 5.

According to the present invention, a substantial part of the portion X to be treated is surrounded by an induction coil block 2D except the welded joint 11 and a portion adjacent thereto. The branch pipe 1D, the pipe base 1C and a portion adjacent to the welded joint 11 are surrounded with an induction coil block 2E. These induction coil blocks 2D and 2E are electrically connected in series into an induction heating coil assembly.

The main pipe 1A has a standard size and a standard shape so that in order to heat the main pipe 1A it might be unnecessary to use the heating apparatus in accordance with the present invention. The induction coil block 2E for heating the branch pipe is designed and constructed in a manner substantially similar to that described above with reference to FIGS. 1-3. That is, induction coils 25-29 of various shapes and sizes are attached to and detached from separators 41 and 42 in a "trial and error" manner until a desired temperature distribution can be obtained. It is of course possible to provide the induction heating coil block 2D in accordance with the present invention in a manner substantially similar to that described above. According to the present invention the whole induction coil block 2E is so designed and constructed that it can be separated from the induction coil block 2D on the main pipe 1A. The space of the induction coil block 2D corresponding to the welded joint 11 between the main pipe 1A and the pipe seat 1C is so selected that the induction coil block 2E for a branch pipe 1D (about 12 inches in diameter) and the pipe base 1C can be connected to the induction coil block 2D.

As described above, according to the present invention, pre-fabricated induction coils of various sizes and shapes are suitably selected and mechanically and electrically assembled with the spacers so that even the portions which are difficult to be uniformly heated because of local variations in shape and wall thickness can be uniformly heated. Furthermore, depending upon an increased or decreased portion to be heated, suitable induction coils can be added or removed. Moreover, the clearances (distances between the outer surfaces of the main pipe 1A, the pipe seat 1C and the branch pipe 1D on the one hand and the induction coils on the other hand) and pitches of the induction coils can be optimumly selected so that the heating operation for the relief of residual stress can be considerably improved and rationalized.

Therefore, according to the present invention, heretofore indispensable mock-up tests and actual measurements of shapes and sizes of objects to be treated on a job site can be eliminated. Furthermore, heretofore unchangeable clearances and pitches can be changed in a simple manner as described above. As a result, the heating operation for attaining a uniform temperature to attain the residual-stress-relief treatment can be carried out in an extremely rationalized manner.

Figure 6:
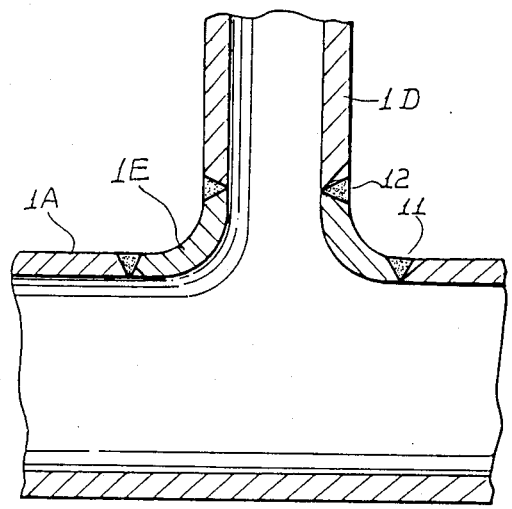
FIG. 6 is a sectional view of another assembly of component parts which is subjected to the residual-stress-relief treatment in accordance with the present invention.
Figure 7:
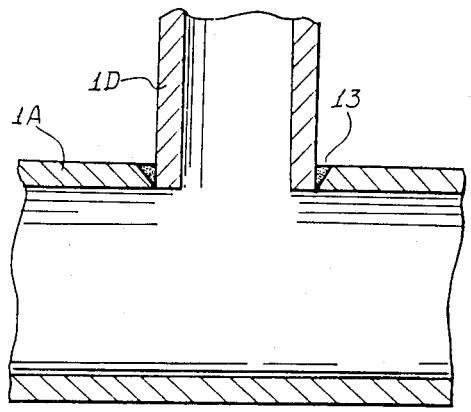
FIG. 7 is a sectional view of a further assembly which is subjected to the residual-stress-relief treatment in accordance with the present invention.

The induction coil assembly as shown in FIG. 5 may be also used to effect the residual-stress-relief treatment of an assembly in which a main pipe 1A is joined to a branch pipe 1D through a so-called "sweepolet" (set-in type nozzle) 1E as shown in FIG. 6 or an assembly of a main pipe 1A and a branch pipe 1D directly welded to the main pipe 1A as shown in FIG. 7. In FIGS. 6 and 7, reference numerals 11, 12 and 13 designate welded joints.

As described above, the present invention can provide a heating method and apparatus which are very effective in relieving residual stress caused in the welded joints and the portions adjacent thereto in a pipe line system of a nuclear power plant under construction or in operation.

What is claimed is:

1. A heating method for effecting residual stress relief treatment of welded joints in a pipe line comprising the steps of:

providing a plurality of induction heating coils;

selecting a plurality of individual induction heating coils each individual one of said heating coils having a shape adapted to surround a welded joint to be heated and each being split into two sections and each of said individual coils having a shape and size selected to heat that portion of pipe line located adjacent thereto to a degree necessary such that the entire area of the pipe line adjacent to the induction coils is uniformly heated, and each being supported by one of a plurality of common spacer means which spacer means can be interconnected with each other, detachably attaching each of said individual induction heating coils to said common spacer means, moving each individual coil in situ to vary the distance between an outer surface of said welded joint and each of the individual induction heating coils as well as the individual pitches between the individual induction heating coils, and interconnecting the induction heating coils attached to said common spacer means mechanically and electrically so that the induction heating coils attached to said spacer means surround said welded joint and a portion adjacent thereto and are substantially uniformly heated to a desired temperature.

2. A heating apparatus for effecting residual-stress-relief treatment of welded joints which join a first pipe to a second pipe in a pipe line comprising a plurality of individual induction heating coils for heating a welded joint and a portion adjacent thereto to a substantially uniform temperature, said plurality of individual induction heating coils each having a shape and a size selected to heat the portion of the pipe line located adjacent thereto to a degree necessary such that the entire area of the pipe line adjacent to said plurality of induction heating coils is uniformly heated, each of said individual heating coils being made of an electrically conductive material, and each including two semi-circular split sections whose ends confront each other to form a plurality of individual circular sections, a plurality of connecting tongues made of electrically conductive material each joined to one end of a heating coil to be in adjacent pairs, a first set of said connecting tongues being in electrical contact with each other and a second set of said connecting tongues being electrically separated from each other, attaching means for detachably mounting each of said plurality of induction heating coils on the pipe line and including a plurality of elongate spacer means made of an electrically insulating material located between pairs of said connecting tongues, said tongues being releasably and movably attached to said spacer means with a plurality of individual heating coils being attached to each spacer means, each of said tongues having a length set according to the diameter of the coil attached thereto so that all of the ends of the tongues attached to the coils surrounding the first pipe can be aligned in a common plane with respect to the first pipe, electrically conducting means coupling the pair of electrically separated tongues of one coil to the pair of electrically separated tongues in an adjacent coil to define a single electrical path through the heating coil and means attaching adjacent spacer means together so that individual coils can be selected to set distances and pitches of such individual coils to alter heat transfer in situ to produce a uniform temperature throughout the heated area.

3. An apparatus according to claim 2 wherein said spacer means are so designed and constructed that they can be selectively interconnected and separated from each other depending upon a configuration of a portion to be heated including a welded joint.

* * * * *